(12) United States Patent
Ouderkirk et al.

(10) Patent No.: US 10,252,940 B2
(45) Date of Patent: Apr. 9, 2019

(54) ROLL PROCESSING OF FILM

(71) Applicant: 3M INNOVATIVE PROPERTIES COMPANY, St. Paul, MN (US)

(72) Inventors: Andrew J. Ouderkirk, St. Paul, MN (US); Robert R. Kieschke, Woodbury, MN (US); Erin A. McDowell, Afton, MN (US); Nicholas T. Gabriel, Woodbury, MN (US); Eugene V. Johnson, Cottage Grove, MN (US); Kelly S. Johnson, Columbia Heights, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 274 days.

(21) Appl. No.: 14/905,201

(22) PCT Filed: Jul. 16, 2014

(86) PCT No.: PCT/US2014/046785
§ 371 (c)(1),
(2) Date: Jan. 14, 2016

(87) PCT Pub. No.: WO2015/009779
PCT Pub. Date: Jan. 22, 2015

(65) Prior Publication Data
US 2016/0152518 A1    Jun. 2, 2016

Related U.S. Application Data

(60) Provisional application No. 61/846,672, filed on Jul. 16, 2013.

(51) Int. Cl.
*B05D 1/28*      (2006.01)
*C03C 17/02*     (2006.01)
(Continued)

(52) U.S. Cl.
CPC ............. *C03C 17/02* (2013.01); *B05D 1/02* (2013.01); *B05D 7/00* (2013.01); *C03C 17/001* (2013.01);
(Continued)

(58) Field of Classification Search
CPC .. C03C 17/02; B05D 1/02; B05D 1/28; B05D 3/12; B29B 15/10
See application file for complete search history.

(56) References Cited

U.S. PATENT DOCUMENTS 3,923,556 A    12/1975 Iszczukiewicz
4,110,878 A *  9/1978 Wenzel ............... H01G 4/22
                                              29/25.42
(Continued)

FOREIGN PATENT DOCUMENTS

JP    2010-247417    11/2010
JP    2011-006788    1/2011
(Continued)

OTHER PUBLICATIONS

Alonso, S., et al., "A torque-based analysis of the reverse roll coating process". Chemical Engineering Science, 58 (2003) 1831-1837.*

(Continued)

*Primary Examiner* — Bret P Chen
(74) *Attorney, Agent, or Firm* — Clifton F. Richardson; Lance L. Vietzke

(57) ABSTRACT

A method of coating film in a roll. A film is wound into a roll with gaps between the layers of the film in the roll. A fluid is forced through the roll such that the fluid deposits a coating on at least one side of the film.

27 Claims, 6 Drawing Sheets

(51) Int. Cl.
  *C03C 17/00* (2006.01)
  *C03C 17/30* (2006.01)
  *B05D 7/00* (2006.01)
  *B05D 1/02* (2006.01)

(52) U.S. Cl.
  CPC .......... *C03C 17/30* (2013.01); *B05D 2252/02* (2013.01); *B05D 2252/10* (2013.01)

(56) References Cited

U.S. PATENT DOCUMENTS

| | | | |
|---|---|---|---|
| 4,553,304 A * | 11/1985 | Fleuret | H01G 4/26 29/25.42 |
| 5,505,995 A * | 4/1996 | Leonard | B05C 5/008 118/324 |
| 5,641,544 A * | 6/1997 | Melancon | B05C 5/007 118/123 |
| 6,168,827 B1 | 1/2001 | Corman | |
| 6,557,269 B1 * | 5/2003 | Schuler | B65H 18/26 34/117 |
| 8,236,116 B2 * | 8/2012 | Sol | C09D 5/008 156/104 |
| 8,304,019 B1 | 11/2012 | Pichler | |
| 2002/0160553 A1 * | 10/2002 | Yamanaka | H01L 21/02524 438/149 |
| 2004/0069885 A1 * | 4/2004 | Kobayashi | C08J 5/18 242/160.4 |
| 2006/0258157 A1 | 11/2006 | Weimer | |
| 2007/0281089 A1 | 12/2007 | Heller | |
| 2008/0305269 A1 | 12/2008 | Sager | |
| 2009/0011146 A1 | 1/2009 | Yamada | |
| 2009/0059475 A1 * | 3/2009 | Arora | H01G 9/02 361/509 |
| 2009/0087646 A1 * | 4/2009 | Sirejacob | C03C 17/30 428/336 |
| 2009/0293942 A1 * | 12/2009 | Harimoto | C23C 18/1212 136/252 |
| 2009/0304924 A1 | 12/2009 | Gadgil | |
| 2010/0304155 A1 | 12/2010 | Fujinami | |
| 2011/0048328 A1 | 3/2011 | Carcia et al. | |
| 2011/0064890 A1 | 3/2011 | Fujinami | |
| 2011/0159186 A1 | 6/2011 | Chakchung | |
| 2011/0195293 A1 * | 8/2011 | Grant | H01G 9/042 429/143 |
| 2011/0256323 A1 | 10/2011 | Dickey | |
| 2012/0171403 A1 | 7/2012 | Dodge | |
| 2015/0217322 A1 * | 8/2015 | Rooijmans | B05D 5/061 427/164 |

FOREIGN PATENT DOCUMENTS

| | | |
|---|---|---|
| JP | 2012-041641 | 3/2012 |
| JP | 2012-193438 | 10/2012 |
| WO | WO 2005-081788 | 9/2005 |
| WO | WO 2007-106076 | 9/2007 |
| WO | WO 2008-057625 | 5/2008 |
| WO | WO 2011-037798 | 3/2011 |
| WO | WO 2011-047210 | 4/2011 |
| WO | WO 2012-012744 | 1/2012 |
| WO | WO 2013-066749 | 5/2013 |

OTHER PUBLICATIONS

Sondergaard, Roar, et al., "Roll-to-roll fabrication of polymer solar cells". Materials Today, Jan.-Feb. 2012, vol. 15, No. 1-2, pp. 36-49.*

Cohu, O., et al., "Rheology and Flow of Paints in Roll Coating Processes". Surface Coatings International 1997 (3), pp. 102-107.*

Schwartz, Evan, "Roll to Roll Processing for Flexible Electronics". Cornell University MSE 542: Flexible Electronics, Prof. Chris Ober, May 11, 2006, pp. 1-24.*

Dameron, "Molecular Layer Deposition of Alucone Polymer Films Using Trimethylaluminum and Ethylene Glycol", Chem. Mater., 2008, vol. 20, No. 10, pp. 3315-3326.

George, "Molecular Layer Deposition of Organic and Hybrid Organic-Inorganic Polymers", Material Matters, 2008, vol. 34, No. 3.2, pp. 1-7.

Sharma, "Spatial atomic layer deposition on flexible substrates using a modular rotating cylinder reactor", Journal of Vacuum Science & Technology A, Jan. 2015, vol. 33, No. 1, pp. 01A132-1--01A132-8.

Soderlund, "Roll-to-roll atomic layer deposition technology for producing single layer ultra-barrier films", LOPE-C, Jun. 2012, pp. 1-16.

Sundberg, "Organic and inorganic—organic thin film structures by molecular layer deposition: A review", Beilstein Journal of Nanotechnology, 2014, vol. 5, pp. 1104-1136.

International Search report for PCT International application No. PCT/US2014/046785 dated Nov. 6, 2014, 3 pages.

* cited by examiner

ROLL PROCESSING OF FILM

BACKGROUND

Thin glass film may be manufactured by one of several techniques. The most common methods are with a fusion draw tower, where molten glass flows over two surfaces, joins over a line, and is drawn into a sheet, or with a re-draw process where a glass plate is heated and drawn into a sheet. Such processes can produce glass film that is less than 100 microns thick and that is flexible enough to be wound into a roll.

Glass film rolls can be used in the same processes as plastic film rolls. For example, a common process applied to plastic film is vacuum coating, which may include physical vapor deposition (including chemical vapor deposition, sputtering, and evaporative coating). While these coating methods are commonly used, they are also expensive. There are several coating methods where conventional roll processing is not generally economically feasible. These include chemical vapor deposition (CVD), low pressure CVD, and atomic layer deposition (ALD), which are all processes commonly used in sheet-based processes where entire plates may be coated at one time. When conventional roll to roll processes can be used, such as batch vacuum roll coating, the process can be very expensive or result in poor coating performance.

There is a need in the art for roll processing of films that provides high performance coatings at a low cost.

SUMMARY

A method of processing a film consistent with the present disclosure includes the steps of winding the film into a roll with gaps between the layers of the film in the roll and forcing a fluid through the gaps. The fluid deposits a coating on at least one side of the film.

An article consistent with the present disclosure includes a roll of coated film with gaps between layers of the coated film in the roll and a manifold disposed adjacent an input edge of the roll. The manifold includes a fluid distribution system.

BRIEF DESCRIPTION OF THE DRAWINGS

The accompanying drawings are incorporated in and constitute a part of this specification and, together with the description, explain the advantages and principles of the invention. In the drawings.

DETAILED DESCRIPTION

Thin glass film may be manufactured with a fusion draw tower where molten glass flows over two surfaces, joins over a line, and is drawn into a sheet, or with a re-draw process where a glass plate is heated and drawn into a sheet. Either of these processes can produce very thin glass, with common thicknesses of 100 microns or less, down to 30 microns, or even 5 microns. These thin glass sheets can be highly flexible and can be wound into a roll.

Sheet and film are terms used herein interchangeably to describe a material that has a planar surface and is sufficiently flexible that it can be formed into a roll at room temperature.

Processes used to coat plastic film can also be used to coat glass films. For example, a common coating process for plastic film is vacuum coating, which may include physical vapor deposition (including chemical vapor deposition, sputtering, and evaporative coating). Vacuum processes can be accomplished by either batch processes, such as where the source and wind up rolls are all contained in a vacuum chamber, or air-vacuum-air processes where the supply and wind up rolls are at atmospheric pressure. However, conventional coating methods are often too expensive or result in poor coating performance.

The present description provides roll processing methods that apply high performance coatings at a low cost to films such as glass films. The coatings are applied by forcing a fluid through gaps between layers in a roll of film. The fluid may be a liquid or a gas or a combination thereof. The coating processes can be used to apply inorganic and organic coatings, including polymeric materials. The coatings may be protective, decorative, and/or have optical or electrical functions. Example coatings include antireflectors, dichroic reflectors, broadband mirrors, and electrically conductive coatings, including metals and transparent conductive oxides (TCO). The film may contain polymer, glass, metal, ceramic, or a combination thereof. The film may have a Young's modulus of greater than 5 GPa or greater than 20 GPa.

Figure 1:
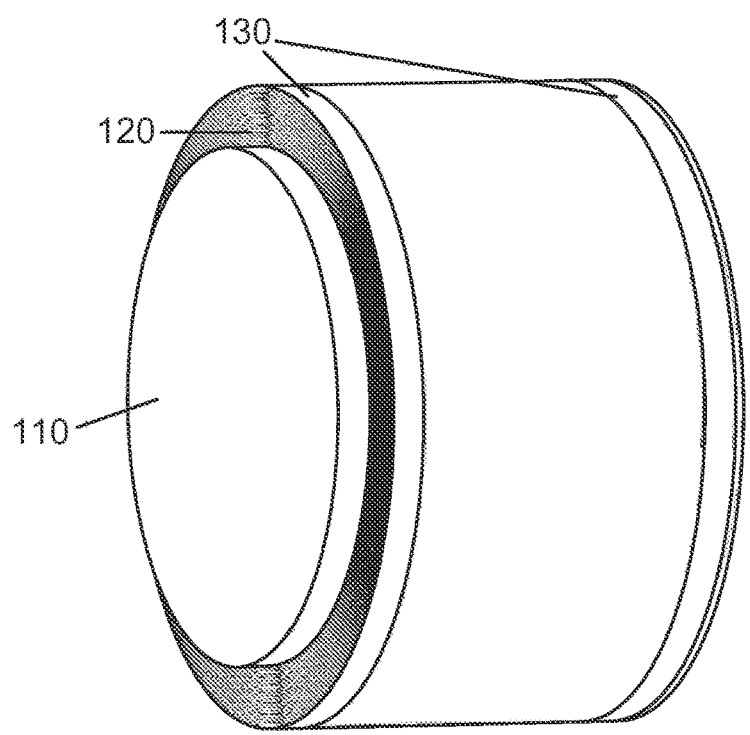
FIG. 1 is a perspective view of a roll of wound spaced film on a core.
Figure 2:
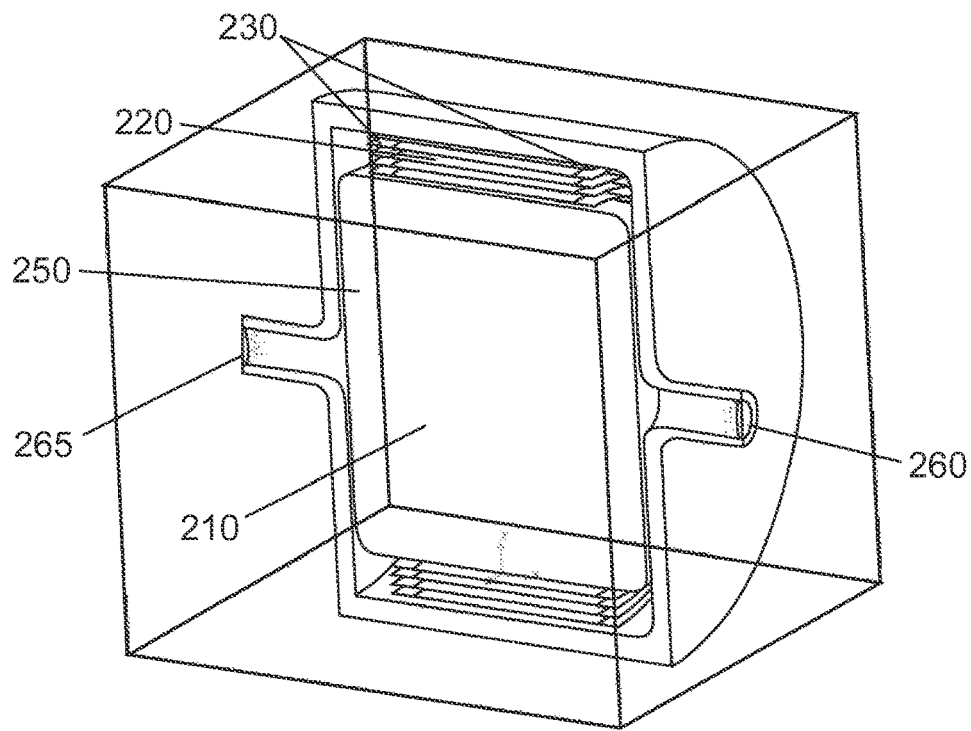
FIG. 2 is a perspective cross-sectional view of the roll of FIG. 1 inside a flow reactor.

FIG. 1 shows a roll of thin film 120 wound around a core 110 and spaced with spacers 130. The spacers 130 serve to provide a consistent gap between the layers of the film 120. The spacers 130 may be designed to allow fluid to pass axially through the layers of the film 120. FIG. 2 shows a cross-sectional view of the roll of FIG. 1 positioned inside a flow reactor 250. Flow reactor 250 includes core 210, inlet 260 and outlet 265. Wound spaced film 220 wraps around core 210 and is spaced apart with spacers 230.

Figure 3:
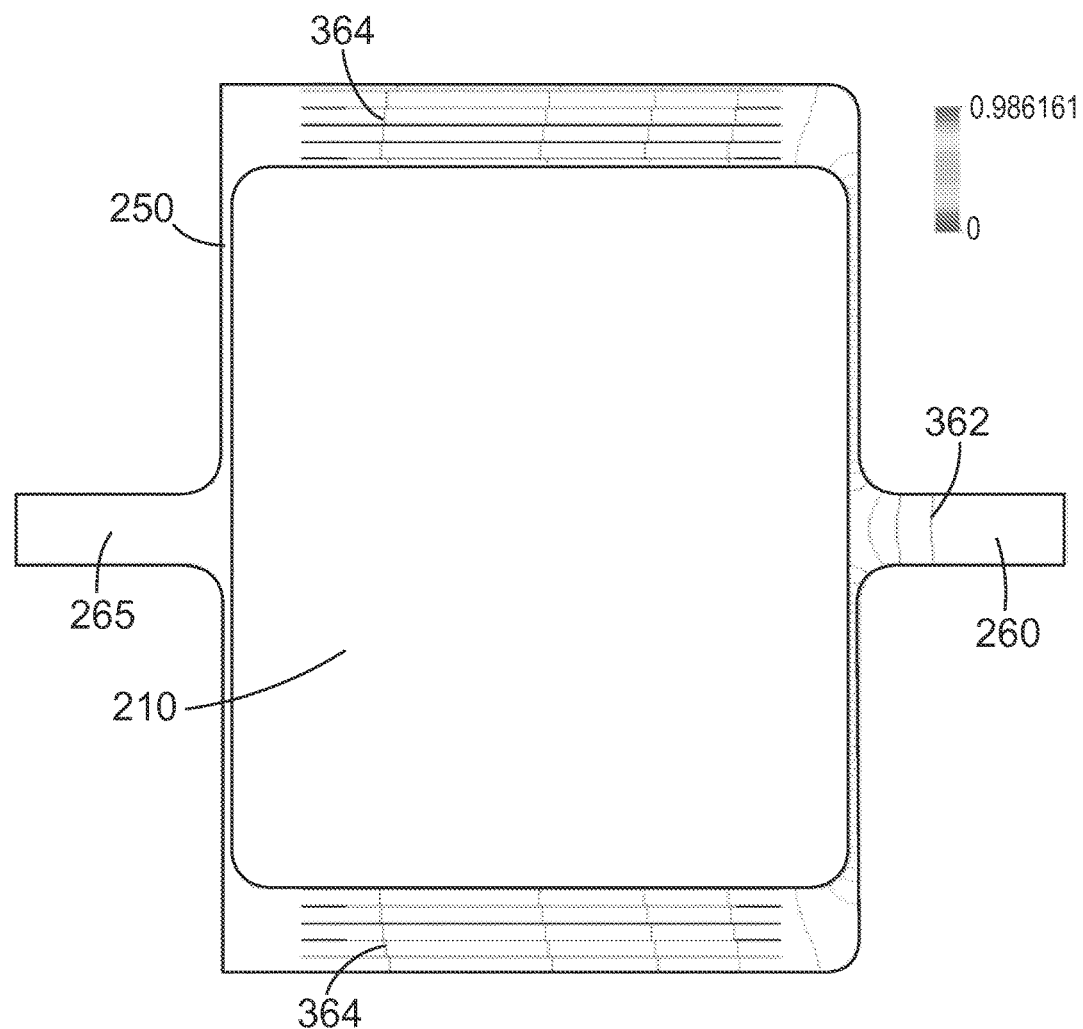
FIG. 3 is a cross-sectional view of a roll in a flow reactor with contour lines for the mass fraction of air inside the reactor.

FIG. 3 shows the reactor and film shown in FIG. 2 with flow modeled with Solidworks Flow (available from Dassault Systems, Vélizy-Villacoublay Cedex, France). The initial conditions used in the simulation were that the reactor was initially filled with air at 1 Torr pressure and the reactor temperature was at 250° C. In the simulation, 1 liter/s of nitrogen at 1 Torr pressure and 250° C. enters through the right lid, and the left lid is maintained at an environmental pressure of 1 Torr. The contour lines in FIG. 3 indicate mass fraction of air in the reactor 0.25 seconds after the 1 liter/s flow was started. Contour line 362 indicates a mass fraction of air of approximately zero, while contour 364 indicates a mass fraction of air of about 0.986. The isolines show that the air is being uniformly displaced by the nitrogen, with some degree of diffusion occurring between the two gases. The simulation shows that an ALD reaction can be created by first mixing a reactant, such as titanium tetrachloride ($TiCl_4$), in an inert gas such as nitrogen or argon. Once sufficient $TiCl_4$ is added to the system, a purge gas of, for example, nitrogen or argon may remove any excess $TiCl_4$. A second reactant may then be flowed through the reactor, such as ozone in air, then a purge gas. The cycle of a first reactant, purge, second reactant, and purge may be repeated as many times and with as many different reactants as needed to achieve the desired results.

Figure 4:
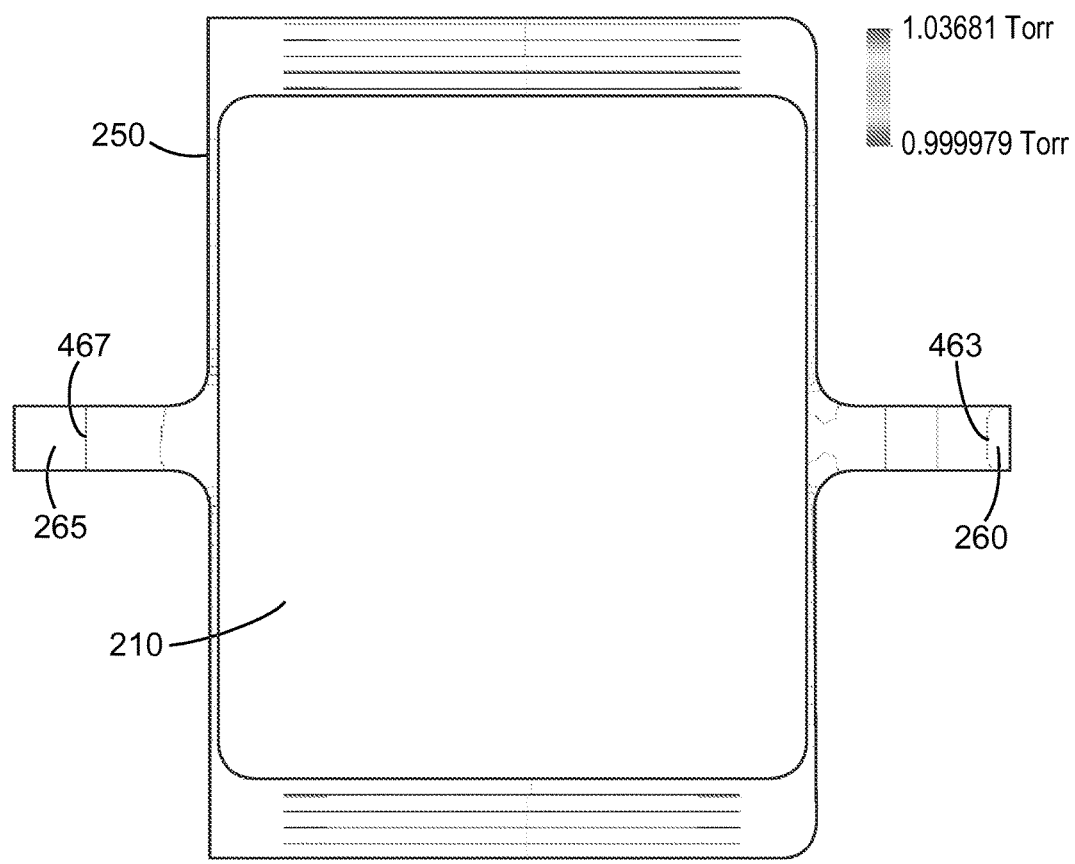
FIG. 4 is a cross-sectional view of a roll in a flow reactor with contour lines for the pressure difference from the input and output edges of the film.

FIG. 4 shows the pressure difference from the input and output edges of the film 0.25 seconds into the nitrogen purge cycle. Contour 463 indicates a pressure of 1.03681 Torr and contour 467 indicates a pressure of 0.999979 Torr. The pressure difference between the input edge of the roll of film and the output edge of the roll of film can drive the gases efficiently through the roll, which increases the efficiency of using the reactant, substantially reduces the time required to apply and purge reactants, and increases coating uniformity. In contrast to this, consider the case where reactant is applied simultaneously to both edges of the film with the roll initially evacuated to a low pressure. When the reactant fills the space between the film layers, the reactant will be depleted from the advancing front of the gas filling the space. Therefore, either the reactant concentration in the gas will need to be high enough to overcome the effects of depletion, or the system will need to remain filled with the reactant until more reactant diffuses to the depleted gas. Either situation is wasteful of time or materials, or both. Furthermore, it will be very difficult to fully remove the excess reactant from the center region of the film. Residual reactants may cause bulk reaction with subsequent reactants, leading to particulate material on the coatings, or defective coatings due to inadequate coverage or local over-coverage.

The Solidworks Flow model for the film roll shown in FIGS. 2-4 used a 100 micron thick film with a 70 micron thick tape applied to both sides of the edge portions of the film. The modeled films had a 1 mm space between layers. The additional space between the layers may be created by features on the tape. The packing efficiency can be substantially increased by reducing this spacing. In some embodiments, the gap between layers is greater than or equal to 5 microns or 10 microns or 100 microns and less than or equal to 250 microns or 1000 microns or 5000 microns. In some embodiments, the film thickness is between about 10 microns and about 500 microns.

Figure 5:
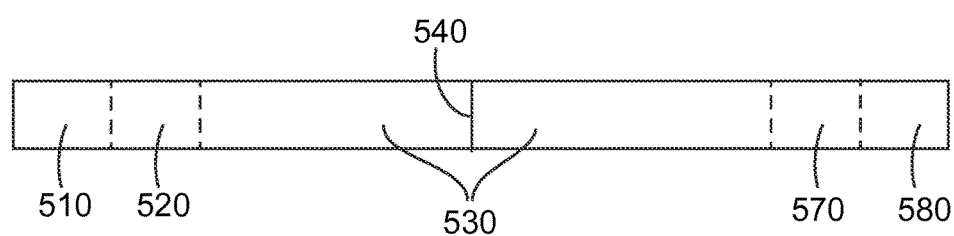
FIG. 5 is a schematic cross-sectional view of a portion of a stack of films on a roll.

FIG. 5 schematically shows a portion of a stack of films on a roll. FIG. 5 shows an input region 510 in front of the stack of films, a first taped portion 520 where a tape spacer is used, and un-taped portion 530, a second taped portion 570, and an output region 580 behind the stack of films. The Solidworks Flow model for this roll used a film thickness of 100 microns and a 70 micron thick tape was applied to both sides of each edge of the film. There was a 60 micron gap between the taped portion of the layers and a 200 micron gap between the un-taped portions of the film. In other words, there was a 300 micron period of the stack of films, with the glass taking up 100 microns, the tape taking 2×70 microns, and the remaining gap being 60 microns. Gas flow was simulated for this system by applying a 5 Torr nitrogen pressure on one edge of the stack and a 1 Torr environmental pressure on the other edge. The reactor, film, and gas temperature were held constant at 250° C. In input region 510 the pressure was about 5.002 Torr and in output region 580 the pressure was about 0.9965 Torr. At contour line 540 the pressure was approximately 3 Torr.

Figure 6:
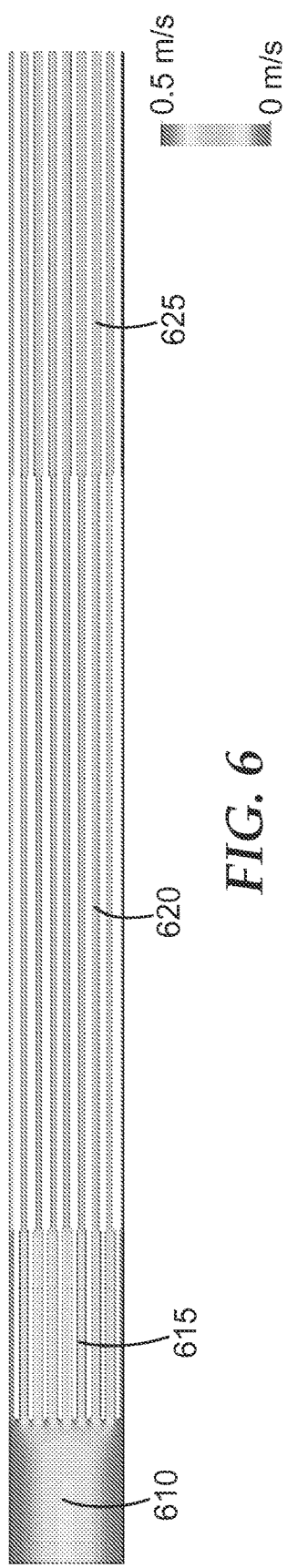
FIG. 6 is a cross-sectional view of a portion of the input edge of a stack of films.
Figure 7:
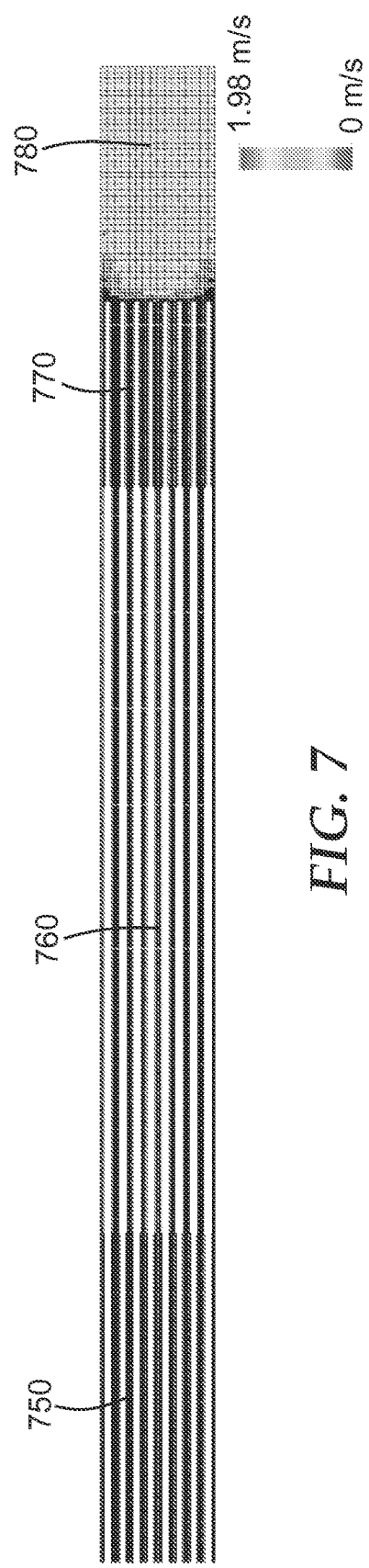
FIG. 7 is a cross-sectional view of a portion of the output edge of a stack of films

FIG. 6 shows the velocity profile of the input edge of the film stack and FIG. 7 shows the velocity profile of the output edge of the film stack using the model parameters described for FIG. 5. FIG. 6 includes input region 610 before the film stack, a first region 615 in the film stack before the taped region, taped region 620, and a second region 625 in the film stack after the taped region. The velocity was approximately zero in the input region 610 and rose to about 0.3 m/s in taped region 620 before dropping to about 0.25 m/s in second region 625. FIG. 7 includes first region 750 in the film stack before the taped region, taped region 760, a second region 770 in the film stack after the taped region, and an output region 780. The velocity was in the range of about 0.5 to about 1 m/s in first region 750, in taped region 760 and in second region 770 and dropped to less than about 0.1 m/s in output region 780.

The gaps between the layers of the film may be provided by applying tape or other structure to the edges of the film. The tape may have a microreplicated, embossed, patterned, printed, or otherwise structured surface to allow fluid flow across the tape or structure. Alternatively, the fluid may flow spirally (i.e., radially and azimuthally) along the film layers. Other methods may be used to hold the film in the desired position, including external fixturing. The gap between the layers is preferably consistent. In some embodiments, the gaps have a standard deviation of less than 100% of the mean gap or less than 50% of the mean gap or less than 30% of the mean gap.

The roll of film with edge tape may alternatively consist of two films that are laminated and wound together such that each film's inner surface prior to lamination and winding has edge tape having the previously described surface structure while each film's outer surface prior to winding has edge tape without intentional surface structure or having a self-wetting property. This can produce a gap allowing axial fluid flow through the volumes bounded by the inner surfaces while preventing or minimizing fluid flow through the volumes bounded by the outer surfaces, thereby providing a method of producing a substantial coating on only one side of each film. Alternatively, the configuration may be the opposite of that described, with structured tape on the outer surface and non-structured tape on the inner surface. Related combinations are also possible, such as tape applied to only one of the two laminated films at the edge of both of its primary surfaces with one surface having structured tape and one having non-structured tape, or having one type of tape applied to one film and the other type applied to the second film.

The reactor design may be such that the volume between the common region for the different reactants to the input edge of the film on the roll is less than 1000% of the total volume of fluid between the film layers. In some embodiments, the volume between the common region for the different reactants to the input edge of the film on the roll is less than 500% or less than 200% of the total volume of fluid between the film layers. The reactor may be designed such that at least 10% of the reactant fluids forced through the reactor pass through the film layers. In some embodiments at least 50% or at least 80% of the reactant fluids forced through the reactor pass through the film layers.

In some embodiments of the present description, fluorosilane or organometallic materials or a combination thereof are deposited onto a substrate, for example, sapphire sheets. The reactors of the present description allow for a sufficiently long deposition time while still having a high throughput, thereby allowing such coatings to be applied. In some embodiments, sapphire sheets are placed in a reactor. For example, a silane vapor may be used to deposit silica onto the sapphire sheets to improve adhesion of subsequently deposited materials resulting from fluorosilane or organometallic materials. This can be done, for example, by passing an inert carrier gas containing vaporized silane through the reactor followed by purging with an inert gas such as nitrogen. Then a carrier gas containing vaporized fluorosilane or organometallic material may be passed through the reactor to provide sapphire sheets having one or both sides coated with an organometallic or a fluorosilane. A subsequent step may involve passing through the reactor an inert carrier gas containing a material that reacts with the previously coated fluorosilane or organometallic material.

In some embodiments, a roll of film includes two films wound together into a roll. This allows a first fluid to deposit a first coating on a first major surface of at least one sheet and a second fluid to deposit a second coating on a second major surface of the at least one sheet.

Figure 8:
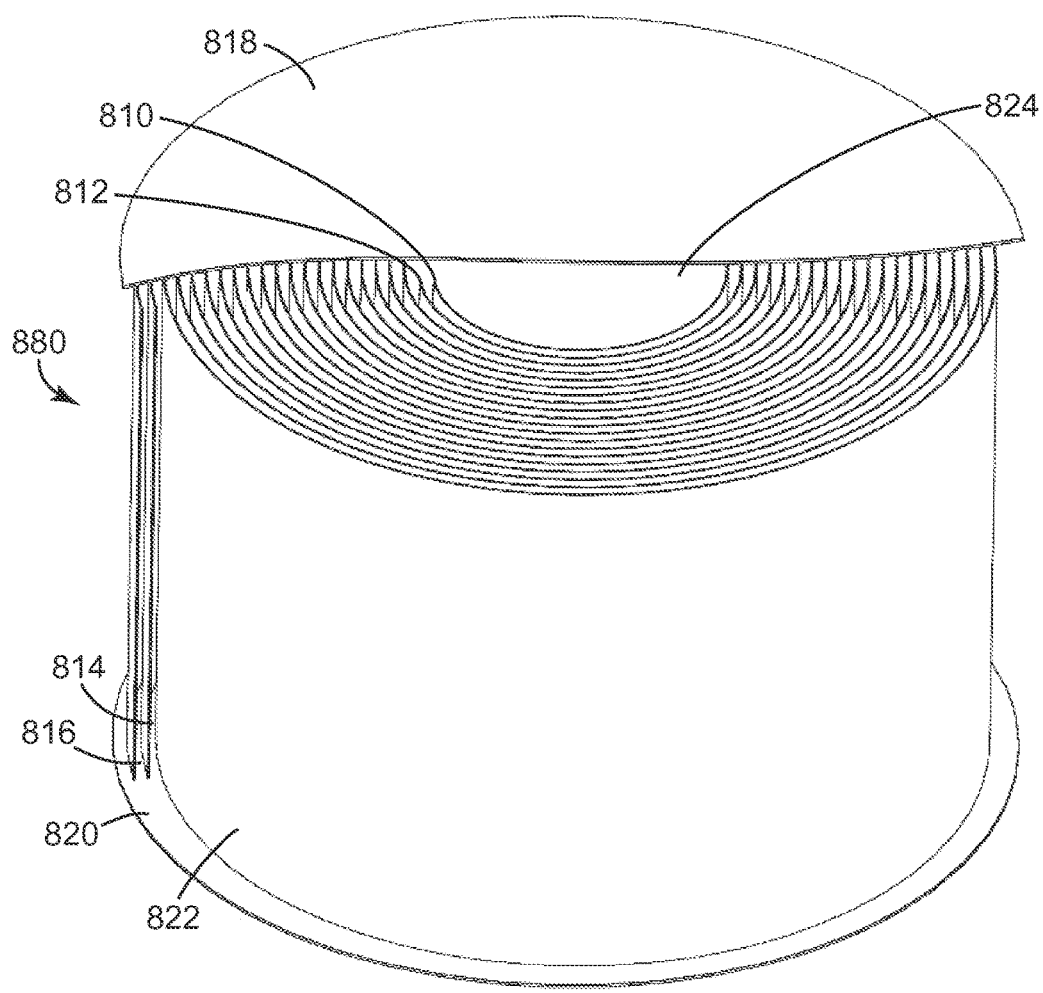
FIG. 8 is a perspective view of a roll of film.

FIG. 8 shows a roll of film 880 that includes a first film 810 and a second film 812. Each of the first and second films 810, 812 has a first side and an opposite second side, and the coiled set of films form a first gap 814 between the first side 822 of the second film 812 and the second side 824 of the first film 810, and a second gap 816 between the second side of the second film 812 and the first side of the first film 810. Roll 880 is positioned between first cover 818 and second cover 820. In some embodiments, different coating fluids, or different coating conditions may be created in the different gaps 814 and 816 by appropriate design of first and/or second covers 818 and 820. The different conditions may include time, temperature, and velocity. Alternatively, the first and second covers 818 and 820 may be used to distribute the coating fluids, allowing coating fluids to flow from, for example, the first cover 818 to the second cover 820.

Figure 9:
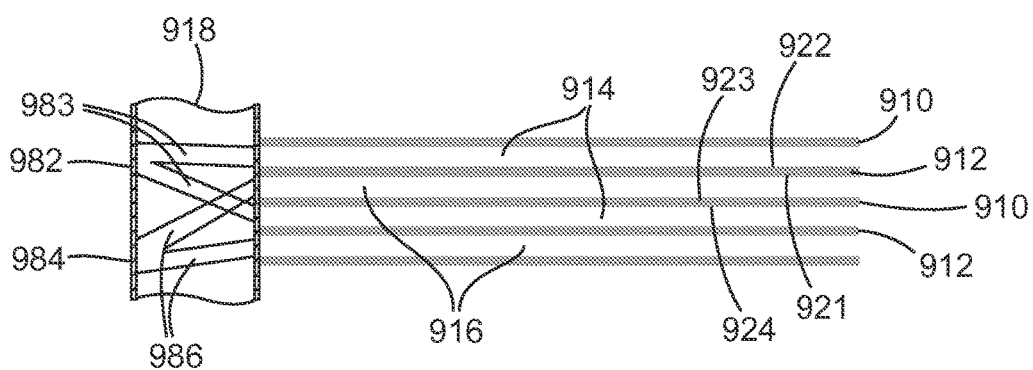
FIG. 9 is a schematic cross-sectional view of a cover and a portion of a roll of film.

A portion of a first cover 918 that can direct a first fluid to first gap 914 and second gap 916 is illustrated in FIG. 9 which shows a portion of first film 910 and second film 912 that is close to the illustrated portion of first cover 918. First cover 918 includes a first input 982 which directs a first fluid through a first set of channels 983 to a first gap 914 between the first side 922 of the second film 912 and the second side 924 of the first film 910. First cover 980 also includes a second input opening 984 which directs a second fluid through a second set of channels 986 to a second gap 916 between the second side 921 of the second film 912 and the first side 923 of the first film 910. First film 910 and second film 912 form a plurality of layers and first gap 914 provides a first set of gaps between the layers and second gap 916 provides a second set of gaps between the layers. The first fluid deposits a first coating on the second side 924 of the first film 910 and a second coating on the first side 922 of the second film 912. The first and second coatings may have substantially the same composition. Similarly, the second fluid deposits a third coating on a second side 921 of the second film 912 and a fourth coating on the first side 923 of the first film 910. The third and fourth coatings may have substantially the same composition and the third and fourth coatings may have a composition that is substantially different from the composition of the first and second coatings.

In some cases it is desired to coat a roll of film that is thin and fragile, for example, a roll of glass film. In some embodiments, the reactor is designed so that the support structure containing the roll of spaced wound film can be removed from the reactor and used as a shipping container. This can allow the roll to be shipped without having to remove the roll from the support structure and repackage it for shipping. The support structure can be returned to the shipper after the recipient has removed the coated roll of film. In some aspects of the present description, a support structure is provided that includes a roll of wound spaced film disposed in the support structure and includes a manifold that includes a fluid distribution system where the manifold is disposed adjacent to an input edge of the roll.

Figure 10A:
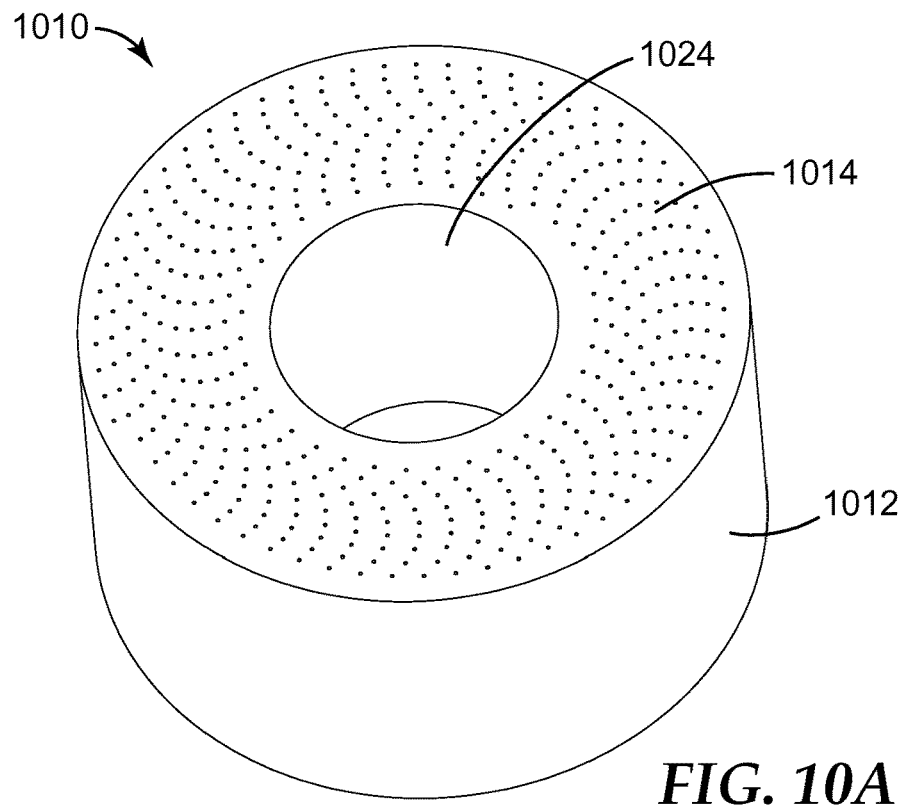
FIG. 10A is a perspective view of a container including a fluid distribution structure.
Figure 10B:
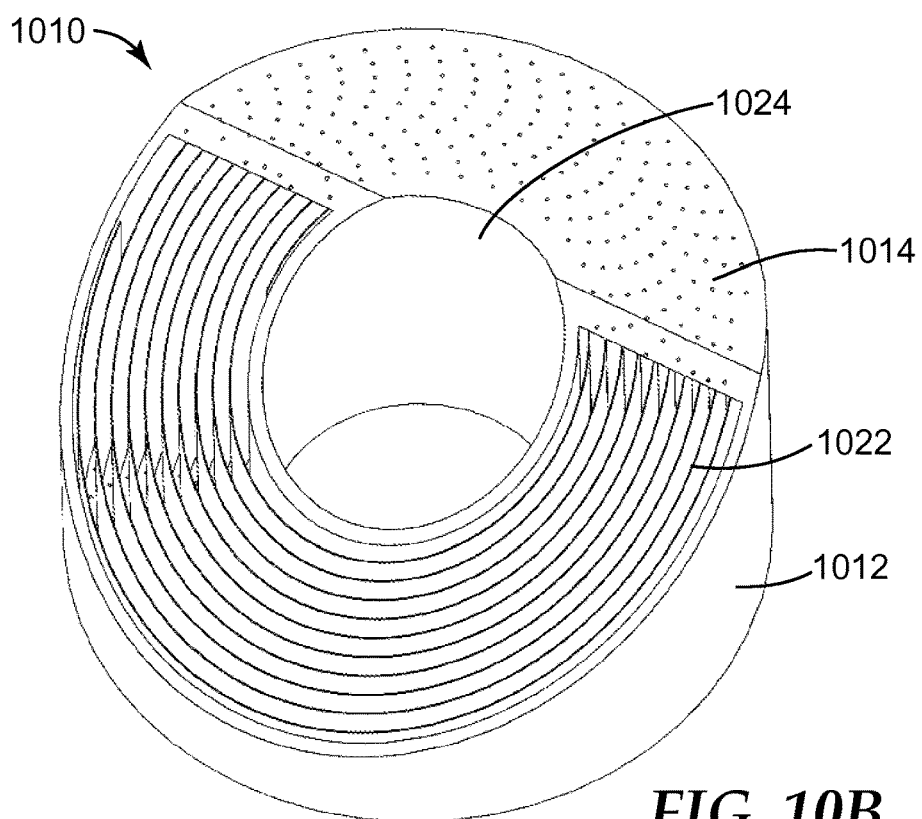
FIG. 10B is a cutout perspective view of the container of FIG. 10A.

An example of a suitable container 1010 for a roll of wound spaced film 1022 that provides a reaction chamber, a storage container, and packaging is shown in FIGS. 10A and 10B. A roll may be positioned in container 1010, where the container 1010 has an outer side structure 1012, an inner side structure 1024, and at least one distribution structure 1014. In some embodiments, a side structure is included on the inside of the roll, or on the outside of the roll, or on both the inside and the outside of the roll as illustrated in FIGS. 10A-10B. In some embodiments, the at least one distribution structure 1014 is on the inlet side of the reactor, or on the outlet side of the reactor, or on both the inlet and the outlet sides of the reactor. The at least one distribution structure 1014 may be a manifold having channels for distributing reactant to gaps between layers in the roll of wound spaced film 1022. Container 1010 may be configured such that at least one of the side structures 1012 and/or 1024 can be removed to allow adding or removing the roll from the container 1010. In some embodiments, the distribution structure 1014 may be replaced with a material suitable for supporting the roll for storage or shipping. FIG. 10B shows the container 1010 with a cutout exposing the roll of wound spaced film 1022. The inner support structure 1024 may also serve to direct reactant flow through the roll of wound spaced film 1022.

Although specific embodiments have been illustrated and described herein, it will be appreciated by those of ordinary skill in the art that a variety of alternate implementations can be used for the specific embodiments shown and described without departing from the scope of the present disclosure. This application is intended to cover any adaptations or variations of the specific embodiments discussed herein.

The invention claimed is:

1. A method of processing a film, comprising the steps of:
   winding the film into a roll with gaps between layers of the film in the roll; and
   forcing a fluid through the gaps,
   wherein the fluid deposits a coating on at least one side of the film,
   wherein a first spacer is positioned adjacent a first edge of the layers of the film and a second spacer is positioned adjacent an opposite second edge of the layers of the film such that the first and second spacers provide the gaps between the layers of the film, the first and second spacers spaced apart from one another in a direction between the first and second edges of the layers of the film.

2. The method of claim 1, wherein the first and second spacers allow fluid to pass axially through the layers of the film.

3. The method of claim 1, wherein each of the first and second spacers has a structured surface.

4. The method of claim 1, wherein each gap between the layers of the film is in the range of 5 to 5000 microns.

5. The method of claim 1, wherein each gap between the layers of the film is in the range of 10 to 1000 microns.

6. The method of claim 5, wherein each gap is in the range of 50 to 250 microns.

7. The method of claim 1, wherein the fluid is forced through the gaps from a first edge to a second edge of the film.

8. The method of claim 1, wherein the film has a thickness between about 10 and 500 microns.

9. The method of claim 1, wherein the fluid is a gas.

10. The method of claim 1, wherein the fluid is a liquid or a combination of a liquid and a gas.

11. The method of claim 1, wherein the film comprises polymer, glass, metal, ceramic, or a combination thereof.

12. The method of claim 11, wherein the film is a glass film.

13. The method of claim 1, wherein the film has a Young's modulus of greater than 5 GPa.

14. The method of claim 13, wherein the film has a Young's modulus of greater than 20 GPa.

15. The method of claim 1, further comprising the steps of positioning the roll inside a flow reactor and forcing a fluid through the flow reactor.

16. The method of claim 15, wherein at least 50% of the fluid forced through the flow reactor passes through the gaps between the layers of the film.

17. The method of claim 16, wherein at least 80% of the fluid forced through the flow reactor passes through the gaps between the layers of the film.

18. The method of claim 1, wherein the fluid deposits a coating on a first surface of the film and on a second surface of the film.

19. The method of claim 1, wherein the fluid deposits a coating on a first surface of the film and a second surface of the film is not coated.

20. The method of claim 1, wherein the film comprises sapphire.

21. The method of claim 1, wherein the coating comprises an organometallic material or a fluorosilane or a combination thereof.

22. The method of claim 1, wherein the coating comprises inorganic and organic materials.

23. The method of claim 22, wherein the coating further comprises fluorosilane.

24. The method of claim 1, further comprising forcing a purge gas through the gaps after forcing the fluid through the gaps.

25. The method of claim 24, wherein the fluid comprises a first reactant, and the method further comprises forcing a second reactant different from the first reactant through the gaps after forcing the purge gas through the gaps.

26. A method of processing film, comprising the steps of:
    winding a first film and a second film into a roll with a first gap between a second side of the first film and a first side of the second film and with a second gap between a first side of the first film and a second side of the second film; and
    forcing a first fluid through the first gap,
    wherein the first fluid deposits a first coating on the second side of the first film and a second coating on the first side of the second film,
    wherein the method further comprises forcing a purge gas through the first gap after forcing the first fluid through the first gap.

27. The method of claim 26, further comprising the step of forcing a second fluid through the second gap, the second fluid having a different composition than the first fluid, wherein the second fluid deposits a third coating on a second side of the second film and a fourth coating on the first side of the first film.

* * * * *